E. BAUSCH.
TELESCOPE.
APPLICATION FILED APR. 17, 1916.
1,270,771.
Patented July 2, 1918.
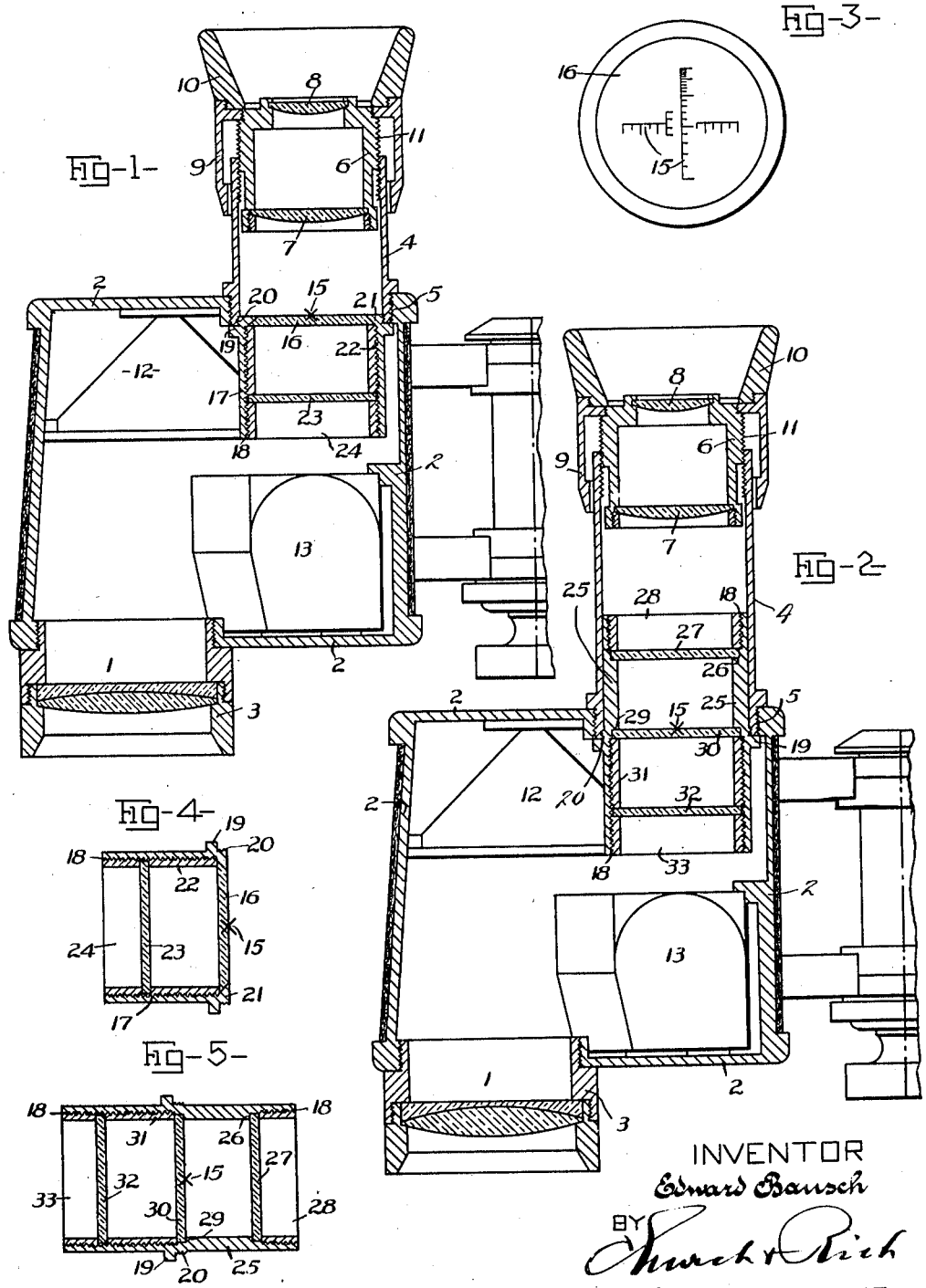
INVENTOR
Edward Bausch
BY
Church & Rich
his ATTORNEYS

UNITED STATES PATENT OFFICE.

EDWARD BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

TELESCOPE.

1,270,771.  Specification of Letters Patent.  Patented July 2, 1918.

Application filed April 17, 1916. Serial No. 91,533.

*To all whom it may concern:*

Be it known that I, EDWARD BAUSCH, a citizen of the United States, residing at Rochester, in the county of Monroe, State of New York, have invented certain new and useful Improvements in Telescopes; and I do hereby declare the following to be a full, clear, and exact description of the same, reference being had to the accompanying drawings, forming a part of this specification, and to the characters of reference marked thereon.

This invention relates to optical instruments and more particularly relates to optical instruments embodying a fiducial mark arranged in a focal plane of the instrument.

In the optical art it is not new to arrange a fiducial mark or scale in the focal plane of an instrument, as has been done in a binocular telescope provided with what is known as a mil scale which comprises a fiducial scale etched on the surface of a glass disk and arranged in the field of the ocular. A disadvantage attending use of this prior instrument is that the delicate mil scale is liable to become temporarily obscured or obliterated by dust or foreign matter which collects on the scale supporting transparent disk or plate. A binocular telescope of the class herein illustrated is peculiarly susceptible to this deposition of dust on the mil scale or other fiducial mark because the body or casing containing the prism systems is usually formed by a casting process which leaves the walls of the interior prism holding chambers more or less rough and scaly and with various corners or projections which are liable to collect dust after a most careful cleaning of the parts when first assembling them, and the joint spaces around the prisms and their fastenings also readily accumulate dust, and this collected dust is shaken off by jars incident to use of the instrument and lodges upon the mil scale support or plate and obscures or obliterates the fiducial mark.

The main object of this invention is to provide a simple and efficient means for preventing the veiling or obliteration of a fiducial mark or scale arranged or imaged in the focal plane of an optical instrument, and more particularly a binocular prism telescope.

In the drawings:

Figure 1 is a sectional elevation of one-half of a binocular prism telescope, in which a lens of the ocular forms a rear dust-guard for a fiducial mark which is further protected by a front dust-guard plate;

Fig. 2 is a sectional view of one-half of a telescope having dust-guard plates arranged out of focus at opposite faces of a transparent plate supporting a fiducial mark;

Fig. 3 is a face view of the transparent plate carrying the fiducial mark, and

Figs. 4 and 5 are sectional side views of the unitary mounting carrying the fiducial mark supporting and dust-guard plates shown in Figs. 1 and 2 respectively.

Similar reference characters throughout the several views indicate the same parts.

Referring now more especially to Figs. 1 to 4 of the drawings, the numeral 1 denotes an objective mounted at the forward end of the field glass body or casing 2 in a suitable detachable mounting 3. An ocular tube 4 is threaded at 5 into the rear end of the body 2 and carries at its outer extremity a suitable mounting 6 in which are fitted a field lens 7 and an eye lens 8. A ferrule 9 is rigidly secured to the lens mounting 6, and to the outer end of the ferrule is secured the guard 10. The lens mounting 6 has external threads 11 fitting internal threads on the tube 4, and by turning the ferrule 9, the position of the lenses 7, 8, may be adjusted in well known manner relatively to the two prisms 12 and 13 which are fitted in the casing 2 and coact to direct the light which passes through the objective 1, into and through the lenses 7 and 8; the optical axis of the instrument passing through the objective 1, the prisms 12, 13, and the lenses 7, 8. Both the right hand and left hand telescope systems of the binocular instrument are identical in structure as thus far described.

The fiducial mark is preferably arranged in the left hand telescope system of the binocular and preferably is a mil scale including two graduated linear scales crossing each other centrally at right angles, as shown at 15 in Fig. 3, and indicated by the conventional cross mark 15 in Figs. 1, 2, 4 and 5 of the drawings. This mil scale is preferably etched into the rear face of a supporting glass plate 16 held within a tubular mounting 17. This mounting has a nearly full length internal screw-thread 18, and near its rear end has an external rib 19, and an adjacent external screw thread 20 which screws into an internal thread of the ocular tube 4, until stopped by contact of the rib 19 with said tube. An internal rear end flange 21 on the mounting 17 is preferably beveled at its inner face and the margin of the mil scale plate 16 is correspondingly beveled to closely fit against the beveled edge of the flange 21, while its rear face is flush with or projects slightly beyond this flange to facilitate easy and thorough cleaning of the outer face of the mil scale plate after it is slipped into the mounting 17, wherein it is held securely by an externally threaded collar or sleeve 22 engaging the mounting thread 18. A glass or other transparent dust-guard plate 23 now is slipped into the mounting 17 and rests against the sleeve 22, and a threaded sleeve 24 is then screwed into the mounting thread 18 and against the guard plate 23 to securely lock it in position within the mounting 17, and at a distance from the mil scale plate 16 of about one-half the comparatively short focal length of the ocular lens system 7, 8, of the telescope and out of the focus of this lens system. The mil scale supporting plate 16 lies in the focus of said lens system 7, 8, and therefore the image of an object formed in the plane of the fiducial mark 15, will clearly appear, simultaneously with the image of the mark, in the field of vision of the instrument, and any dust particles which may chance to adhere to the outer front face of the dust-guard plate 23, which is out of focus of the lenses 7, 8, will not appreciably affect the clarity of vision and will but slightly reduce the illumination. Experiments have proved that a comparatively large opaque object lodged on the outer front face of the dust-guard plate 23, can be but faintly seen in the field of vision as an apparently transparent object slightly darker in color than the field itself.

In the above described binocular instrument the close joint of the threads 11 of the ocular lens mounting 6, with the tube 4, and the tight joint of the inner field lens 7 with this mounting may be relied upon as a guard to exclude dust from the opposed rear face of the plate 16 upon which the fiducial mark 15 is etched.

In any optical instrument whose ocular lenses have a sufficiently long focus to give room for a second independent dust-guard plate located out of the focus of said lenses, it is possible in accordance with this invention, to use two dust-guard plates, one arranged opposite each face of the mil scale plate, one example of such modified construction being shown in the prism telescope sufficiently illustrated in Figs. 2 and 5 of the drawings. In this instrument a tubular mounting 25, which is internally threaded at 18 at opposite ends has an internal shoulder 26 against which, and out of the focus of the ocular lenses 7, 8, is placed a rear transparent dust-guard plate 27, held in place by a sleeve 28 screwed into the rear mounting threads 18. Against another internal shoulder 29 of the mounting 25 rests in the focus of the lenses 7, 8, a transparent plate 30 having etched thereon any approved fiducial mark such as the mil scale 15 shown in Fig. 3. The mil scale plate 30 is held in position by a second sleeve 31 screwed into the front mounting threads 18. Against the forward end of the sleeve 31 rests a second dust-guard plate 32 which is held in position out of the focus of the lenses 7, 8, by a third sleeve 33 screwed into the mounting threads 18. In this modified construction the two transparent dust-guard plates 27, 32, respectively, oppose opposite faces of the mil scale plate 30, and thus effectively guard against dust veiling or obliteration of the fiducial mark independently of the lens system of the instrument.

In the prism telescopes sufficiently shown in Figs. 1 and 2 of the drawings, the mounting carrying the mil scale fiducial mark and its dust-guard plate or plates, constitutes a complete unitary structure which may be made in quantities on the system of interchangeable parts, and may be applied to the respective short and long focus telescopes by simply screwing the mounting 17 or 25, at its threads 20 into the forward end of the ocular tube 4, prior to screwing said tube at 5, into the body or casing 2 of the instrument.

Having thus described my invention, what I claim and desire to secure by Letters Patent of the United States is:

1. In an optical instrument, the combination with an objective, and an ocular tube closed at one end by an ocular mounted therein, of a tubular mounting having a fiducial mark and a closure plate mounted therein, in spaced relation to the mark, said mounting being adapted to be attached to the ocular tube at a point between the objective and the ocular with the fiducial mark in the focal plane of the ocular and with the closure plate beyond said focal plane, out of focus of the ocular.

2. In an optical instrument, the combination with a casing closed at one end by a lens system mounted therein, a mounting carrying a fiducial mark, adapted to be attached to said casing with the fiducial mark in the focal plane of the lens system, and a transparent closure plate supported in said mounting in a plane substantially parallel to the plane of the fiducial mark and spaced, a distance approximating half the focal length of the lens system, beyond said focal plane.

3. In an optical instrument, the combination with an objective and an ocular, of a tubular mounting provided with a transparent closure at or near each end, and a fiducial mark arranged within said mounting in spaced relation to both of said closures, said mounting being adapted to be positioned in the path of light between the objective and the ocular with the fiducial mark in a focal plane of the instrument and with the exposed surfaces of the closures out of focus.

4. In an optical instrument, the combination with a body or casing, an objective mounted at the forward end of the casing, an ocular tube secured to the rear end of the casing, a lens system in the ocular tube, and a prism system interposed in the optical axis of the objective and ocular lens systems, of a tubular mounting attached at the forward end of the ocular tube, a transparent plate carrying a fiducial mark and held by the mounting in the focal plane of the ocular lens system, a transparent closure plate held by the mounting and guarding the fiducial mark from dust and located out of the focus of the ocular lens system, and means securing the fiducial mark carrying plate and the dust-guard closure plate to the mounting in the aforesaid relative positions.

5. In an optical instrument, the combination with a body or casing, an objective mounted at the forward end of the casing, an ocular tube secured to the rear end of the casing, a lens system in the ocular tube, and a prism system interposed in the optical axis of the objective and ocular lens systems, of a tubular mounting attached at the forward end of the ocular tube and having an internal shoulder and internal screw-threads, a transparent plate carrying a fiducial mark and placed within the mounting against its shoulder and in the focal plane of the ocular lens system, a transparent closure plate in the mounting guarding the fiducial mark from dust and located out of the focus of the ocular lens system, and sleeve means engaging the internal threads of the mounting and securing the fiducial mark carrying plate and the dust-guard closure plate to the mounting in the aforesaid relative positions.

EDWARD BAUSCH.

Witnesses:
CARL F. LONEL,
GUSTAV ERBE.